Figure 1:
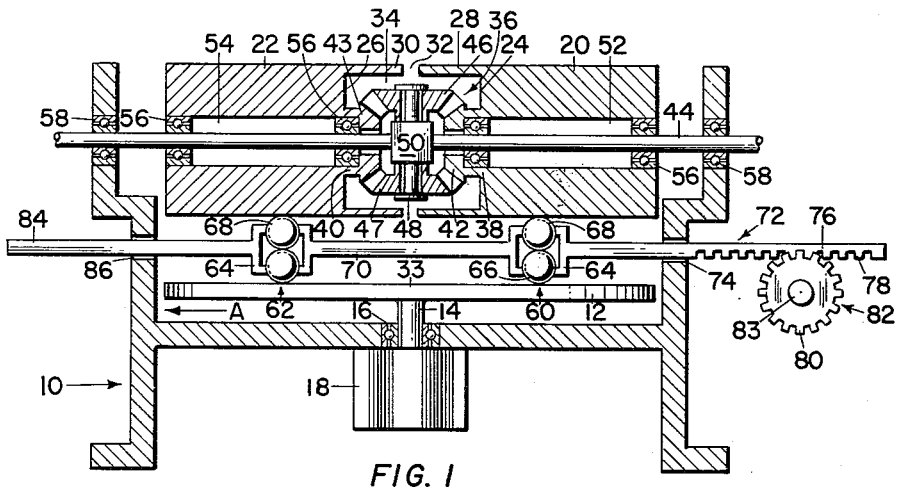

Sept. 11, 1956

H. A. VAN DYKE 2,762,239

VARIABLE SPEED TRANSMISSION

Filed Sept. 28, 1953

INVENTOR
HENRY A. VAN DYKE

BY

ATTORNEYS

United States Patent Office
2,762,239
Patented Sept. 11, 1956

2,762,239

VARIABLE SPEED TRANSMISSION

Henry A. Van Dyke, Malibu, Calif.

Application September 28, 1953, Serial No. 382,883

2 Claims. (Cl. 74—690)

(Granted under Title 35, U. S. Code (1952), sec. 266)

The invention described herein may be manufactured and used by or for the Government of the United States of America for governmental purposes without the payment of any royalties thereon or therefor.

This invention relates to variable speed transmissions, and is particularly concerned with those of the ball-disk-cylinder type. The transmission mechanisms of the invention are adapted for use in speed control devices generally, and especially in integrators and differentiators.

Variable speed transmissions of the general type to which the invention relates are shown, for example, in U. S. Patents 1,448,490 and 2,602,338. These devices comprise a ball or a pair of balls in riding contact with two rotatable elements such as a disk and roller (or cylinder). However, prior art devices such as those of the above two patents have limitations in that they produce low power at low output speeds, since the rate of rotation of the cylinder as well as the output shaft of such devices approaches zero when the ball or balls thereof approach the center of the disk. Under these conditions where the cylinder is rotating very slowly it is difficult to obtain constant output speed due to imperfections in the balls, and the devices operate sluggishly. In the 2,602,338 patent, it is proposed to increase the torque transmission by applying a superfinish to the disk. Further, in the prior art devices illustrated in the above patents, an undesirable "dimple" is worn in the drive disk at zero output speed when the ball or balls of such devices are located at the center of the disk, resulting in faulty operation of the mechanism and the necessity for replacing the disk at comparatively frequent intervals.

One object of the invention is the provision of a novel variable speed transmission mechanism, particularly adapted for use in integrators and differentiators.

A particular object is to provide novel means or structure in a variable speed transmission device of the ball-disk-cylinder type to permit operation of such device from positive rotation through zero to negative rotation of the output shaft without causing the members of the assembly other than the output shaft to come to rest, to thus produce positive torque at all speeds including zero speed of such shaft.

Another object is the provision of a variable speed transmission of the foregoing type wherein the sensing ball or balls at no time during operation ride at the center of the drive disk, thus preventing the wearing of a "dimple" or depression in the center of the disk.

Another aim of the invention is to afford a novel variable speed transmission mechanism which is sturdy and comparatively inexpensive to construct, and is reliable and efficient in operation.

Figure 2:
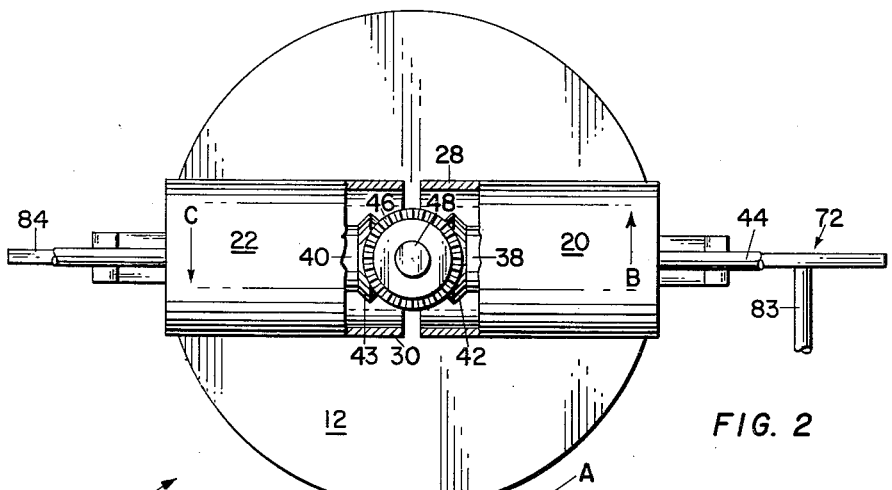
Figure 3:
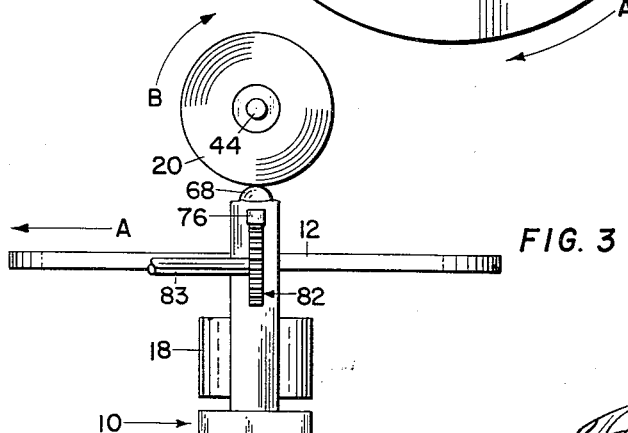

Other objects and many of the attendant advantages of this invention will be readily appreciated as the same becomes better understood by reference to the following detailed description when considered in connection with the accompanying drawings wherein:

Fig. 1 is a central longitudinal section through a variable speed transmission constructed in accordance with the invention, certain elements being shown in full for clarity, Fig. 2 is a plan view of the device of Fig. 1, partly broken away to show certain details, and Fig. 3 is an end view of the device of Fig. 1, with certain parts removed.

Briefly, according to one embodiment of the invention, the foregoing objects and advantages are accomplished by provision of a variable speed transmission having a structure including a rotatable disk driven by an input shaft, a pair of roller members or cylinders rotatable about an axis normal to the axis of rotation of the disk, a differential mechanism connecting the roller members together, an output shaft connected to the differential mechanism and positioned along the axis of the roller members, and driving means disposed between the disk and each of the roller members. The driving means are in the form of two pairs of caged balls, one pair being engaged between the disk and one of the roller members, and the other pair being engaged between the disk and the other roller member. The two pairs of caged balls are arranged in fixed spaced relation to each other, and a movable member or arm is connected to these two torque transmitting ball systems to adjust the position thereof relative to the face of the disk, and to thus vary the speed of the output shaft. In this manner, as will be seen more clearly hereinafter, the output shaft will rotate in a direction and at a speed in response to displacement of the respective torque transmitting ball systems toward and away from the center of the disk.

Referring to Figs. 1, 2 and 3 of the drawing illustrating one embodiment of the invention, numeral 10 represents a frame which supports a drive disk 12 rotatable on an input shaft 14 passing through bearings 16 in the frame, the shaft being driven by a constant speed motor 18 attached to the frame.

A pair of follower cylinders 20 and 22 having essentially the same diameter are disposed in spaced relation to and diametrically across disk 12, and are arranged for rotation about an axis normal to the axis of rotation of disk 12, corresponding to the axis of input shaft 14. Each of the cylinders is symmetrically located opposite the respective halves of the disk, and the cylinders are spaced from each other to permit independent rotation of each of them at relatively different speeds. The adjacent ends 24 and 26 of cylinders 20 and 22 each have a flange 28 and 30, respectively, formed thereon, there being a small space 32 left between the ends of the respective flanges to permit free movement of each of the follower cylinders. It is noted that space 32 is located directly above the center 33 of the disk. In the large space 34 formed by flanges 28 and 30 and by adjacent ends 24 and 26 of the cylinders is disposed a gear train differential mechanism represented generally by the numeral 36, which is attached by means of annular connector members 38 and 40 to follower cylinders 20 and 22, respectively.

Differential 36 is constructed of a pair of oppositely disposed spaced gears 42 and 43 mounted on roller bearings (not shown) for free rotation on a rotatable output shaft 44, and a pair of oppositely disposed spaced gears 46 and 47 each mounted for rotation by means of roller bearings (not shown) at opposite ends of a pin 48 positioned normal to the output shaft, such pin being fixed by means of center block 50 to the output shaft for rotation thereof with the pin and its associated gears 46 and 47. Output shaft 44 extends outwardly from both sides of the differential through hollow central portions 52 and 54 in follower cylinders 20 and 22, respectively, and supports the differential mechanism and also the follower cylinders for free rotation of the cylinders on such shaft by means of bearings 56 positioned at opposite ends of the hollow portions in each of the cylinders. In turn, output shaft 44 is rotatably supported on frame 10 by means of bearings 58. Because of the members 38 and 40 attaching gears 42 and 43 of the differential to follower cylinders 20 and 22, respectively, it will be seen that each of the cylinders and its attached gear 42 or 43 will rotate in unison.

According to the above described structure, follower cylinder 20 and its attached gear 42 are adapted to rotate in a direction opposite to that of follower cylinder 22 and its attached gear 43. If the speeds of rotation of the two follower cylinders are equal, the speed of rotation of the output shaft will be zero. If one cylinder rotates faster than the other, pin 48 with its associated gears 46 and 47 will rotate within the differential about the axis of output shaft 44, causing the latter to rotate with pin 48 at a speed dependent upon the difference in speeds of the two follower cylinders.

Disposed in driving relation between disk 12 and follower cylinders 20 and 22, respectively, are a pair of torque transmitting or driving means 60 and 62 serving to transmit torque from disk 12 to follower cylinders 20 and 22, respectively. Each of these means is constructed of a cage 64 having a pair of balls 66 and 68 positioned therein, these balls being in engagement with each other. One of the balls 66 is also in contact with disk 12 while the other ball also makes contact with the adjacent follower cylinder 20 or 22. A rigid member 70 connects cages 64 of each of the torque transmitting means to maintain them in fixed spaced relation to each other.

An arm 72 positioned between disk 12 and follower cylinder 20 and parallel to the disk and output shaft 44, is fixed at one end to the cage of driving means 60 and extends outwardly through and in slidable engagement with a guide notch 74 in frame 10. The outer portion 76 of arm 72 is in the form of a rack having teeth 78 thereon meshing with the teeth 80 of a pinion 82 driven by a shaft 83 for moving the arm and attached torque transmitting means 60 and 62 simultaneously in a direction parallel to the surface of disk 12 in order to adjust the position of such driving means relative to the center 33 of the disk. An elongated member 84 is attached at one end to cage 64 of torque transmitting means 62 and extends through and in slidable engagement with another notch 86 in frame 10 directly opposite notch 74. Member 84 serves to properly guide driving means 60 and 62 with their respective cages and balls along a diameter of the surface of disk 12 on movement of arm 72.

In operation the position of the two cages 64 and their respective balls relative to the center of disk 12 is adjusted as desired by actuation of pinion 82 which in turn moves arm 72. On rotation of drive disk 12 say in a clockwise direction as shown by arrows A in the drawing, balls 66 and 68 of torque transmitting means 60 will respectively rotate in a direction to cause follower cylinder 20 to rotate clockwise as shown by arrows B, and balls 66 and 68 of torque transmitting means 62 will rotate respectively in a direction to cause follower cylinder 22 to rotate counterclockwise as shown by arrow C, when viewed from the end of the device shown in Fig. 3.

If the two torque transmitting means 60 and 62, or cages 64, are equidistant from the center 33 of the disk, the cylinders will rotate at equal speeds in opposite directions and the speed of rotation of output shaft 44 will be zero. If drive means 60 is positioned farther from the center of the disk than drive means 62, cylinder 20 will rotate more rapidly in its clockwise direction than cylinder 22 rotates counterclockwise, causing output shaft 44 to rotate in the direction of the faster cylinder 20, that is clockwise, at a rate proportional to the amount of displacement of the two drive means from the position where they are equidistant from the center of the disk. If drive means 62 is displaced farther from the center of the disk than drive means 60, then cylinder 22 will rotate faster counterclockwise than cylinder 20 rotates clockwise, causing the output shaft to rotate counterclockwise at a speed proportional to such displacement. Under each of the two immediately foregoing conditions of operation, the output shaft will rotate at a rate equal to one half the difference in cylinder speeds.

It is particularly noted from the embodiment shown and described that the invention device including a differential operates from positive rotation through zero to negative rotation of the output shaft without causing balls 66 and 68 of torque transmitting means 60 and 62, or follower cylinders 20 and 22 to come to rest, thus providing positive torque at all speeds of the output shaft including zero speed. Further, since neither of the torque transmitting means 60 or 62 is ever positioned at the center 33 of disk 12 in the operation of the invention device, the wearing of a "dimple" or depression in the center of the disk, inherent in the operation of the devices of the prior art as illustrated in the aforementioned patents, is avoided in the transmission mechanism of this invention. Moreover since the balls 66 and 68 of the drive means, and the follower cylinders of the invention are always moving at a comparatively rapid rate even though the output shaft is approaching or is actually at zero speed, the device provided herein affords smoother and better speed control of the output shaft as it approaches zero speed than in the prior art devices. Also, the device provided according to the invention is sturdy, may be constructed comparatively inexpensively from readily available parts, and is efficient and reliable in operation.

Instead of having cages 64 of each of the torque transmitting means 60 and 62 rigidly connected together for simultaneous displacement thereof by means of arm 72, as described above in connection with the embodiment shown in the drawing, such connection can be omitted and one of the cages of these drive means can be held in a fixed position relative to the face of the disk while the cage of the other drive means on the opposite side of the disk is made adjustably movable by means such as arm 72; or such connection can be omitted and both cages made freely and independently movable with respect to each other, each of such cages having connected thereto means such as arm 72 and its associated mechanism for adjustably positioning each of the torque transmitting means independently of the other. Further, if desired, follower cylinders 20 and 22 may be of different diameter.

Obviously many modifications and variations of the present invention are possible in the light of the above teachings. It is therefore to be understood that within the scope of the appended claims the invention may be practiced otherwise than as specifically described.

I claim:
1. A variable speed transmission which comprises a disk rotatable about an axis, a pair of spaced apart follower cylinders rotatable about a second axis normal to the rotational axis of said disk, each of said cylinders being disposed on opposite halves of the disk, a gear train differential mechanism connecting the inner adjacent ends of the cylinders, said cylinder ends being hollow and having a core diameter greater than the differential mechanism to form a housing therefor, an output shaft driven by said differential mechanism and positioned along said second axis, a pair of torque transmitting means disposed in driving relation between said respective cylinders and the disk, and means connected to said torque transmitting means for displacement with respect to the disk axis.

2. A variable speed transmission which comprises a disk rotatable about an axis, a pair of spaced apart follower cylinders rotatable about a second axis normal to the rotational axis of said disk, each of said cylinders disposed on opposite halves of the disk, a gear train differential mechanism connecting the inner adjacent ends of the cylinder, the inner ends of the cylinders having annular flange extensions forming a recess to house the differential mechanism, the free ends of said flanges closely spaced apart at the disk center, an output shaft driven by said differential mechanism and positioned along said second axis, a pair of torque transmitting means disposed in driving relation between said disk and the follower cylinders, each of said transmitting means comprising a cage and a pair of balls mounted within the cage and mutually engaged, one of said balls also being in contact with said disk and the other also in contact with a respective follower cylinder, means connected to said cages for displacement with respect to the disk axis.

References Cited in the file of this patent

UNITED STATES PATENTS

| | | |
|---|---|---|
| 578,536 | Auriol | Mar. 9, 1897 |
| 1,691,389 | Garrard et al. | Nov. 13, 1928 |
| 2,481,039 | Ross | Sept. 6, 1949 |

FOREIGN PATENTS

| | | |
|---|---|---|
| 80,722 | Germany | May 20, 1895 |
| 431,009 | Germany | June 29, 1926 |